(12) United States Patent
Fujii et al.

(10) Patent No.: US 8,159,734 B2
(45) Date of Patent: Apr. 17, 2012

(54) OSCILLATOR DEVICE, OPTICAL DEFLECTOR AND IMAGE FORMING APPARATUS USING THE SAME

(75) Inventors: Kazunari Fujii, Kawasaki (JP); Suguru Miyagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 12/667,074

(22) PCT Filed: Sep. 1, 2008

(86) PCT No.: PCT/JP2008/066133
§ 371 (c)(1),
(2), (4) Date: Dec. 29, 2009

(87) PCT Pub. No.: WO2009/028739
PCT Pub. Date: Mar. 5, 2009

(65) Prior Publication Data
US 2011/0019252 A1    Jan. 27, 2011

(30) Foreign Application Priority Data
Aug. 30, 2007    (JP) .................................. 2007-224092

(51) Int. Cl.
*G02B 26/08*    (2006.01)
(52) U.S. Cl. ..................................................... 359/199.1
(58) Field of Classification Search .... 359/199.1–199.4, 359/223.1–226.1, 871, 872
See application file for complete search history.

(56) References Cited

U.S. PATENT DOCUMENTS

| | | | |
|---|---|---|---|
| 5,347,124 A | 9/1994 | Narukawa et al. | 250/235 |
| 7,271,943 B2 | 9/2007 | Yasuda et al. | 359/224 |
| 7,859,733 B2 * | 12/2010 | Cannon et al. | 359/199.1 |
| 2003/0090771 A1 | 5/2003 | Sakai | 359/198 |
| 2005/0280879 A1 | 12/2005 | Gibson et al. | 358/474 |

FOREIGN PATENT DOCUMENTS

| | | |
|---|---|---|
| EP | 1 369 732 A2 | 12/2003 |
| JP | 5-045603 A | 2/1993 |
| JP | 6-006537 A | 1/1994 |
| JP | 9-101474 A | 4/1997 |
| JP | 2005-208578 A | 8/2005 |
| JP | 2005-326462 A | 11/2005 |
| JP | 2005-326745 A | 11/2005 |
| JP | 2005-326746 A | 11/2005 |
| WO | WO 2005/063613 A1 | 7/2005 |
| WO | WO 2007/094489 A1 | 8/2007 |

OTHER PUBLICATIONS

Office Action dated May 25, 2011, issued by the Chinese Patent Office in a related Chinese patent application.

* cited by examiner

*Primary Examiner* — Euncha Cherry
(74) *Attorney, Agent, or Firm* — Fitzpatrick, Cella, Harper & Scinto (57) ABSTRACT

An oscillator device includes a supporting member, an oscillation system having plural oscillators and plural torsion springs, a driving device for oscillating the oscillation system, a drive control device for controlling the driving device, an oscillation detecting device for detecting a state of oscillation of an oscillator of the oscillation system, a resonance frequency calculating device for calculating a resonance frequency of the oscillation system based on an output of the oscillation detecting device, and a control parameter adjusting device for adjusting a control parameter of the drive control device, wherein the control parameter adjusting device adjusts a control parameter based on an output of the resonance frequency calculating device.

12 Claims, 13 Drawing Sheets

| $\omega/2\pi$ \ f2/f1 | f1−Δf/3 ~ f1+Δf/3 | f1+Δf/3 ~ f2/2−Δf/3 | f2/2−Δf/3 ~ f2/2+Δf/3 |
|---|---|---|---|
| <1.999 | Kp_A1=1.0<br>Kd_A1=1.0<br>Kp_A2=0.8<br>Kd_A2=0.8<br>Kp_φ=0.8<br>Kd_φ=0.8 | Kp_A1=1.1<br>Kd_A1=1.1<br>Kp_A2=0.9<br>Kd_A2=0.9<br>Kp_φ=0.9<br>Kd_φ=0.9 | Kp_A1=1.2<br>Kd_A1=1.2<br>Kp_A2=1.0<br>Kd_A2=1.0<br>Kp_φ=1.0<br>Kd_φ=1.0 |
| 1.999≤, ≤2.001 | Kp_A1=1.0<br>Kd_A1=1.0<br>Kp_A2=1.0<br>Kd_A2=1.0<br>Kp_φ=1.0<br>Kd_φ=1.0 | Kp_A1=1.0<br>Kd_A1=1.0<br>Kp_A2=1.0<br>Kd_A2=1.0<br>Kp_φ=1.0<br>Kd_φ=1.0 | Kp_A1=1.0<br>Kd_A1=1.0<br>Kp_A2=1.0<br>Kd_A2=1.0<br>Kp_φ=1.0<br>Kd_φ=1.0 |
| >2.001 | Kp_A1=1.0<br>Kd_A1=1.0<br>Kp_A2=1.4<br>Kd_A2=1.4<br>Kp_φ=1.4<br>Kd_φ=1.4 | Kp_A1=0.9<br>Kd_A1=0.9<br>Kp_A2=1.2<br>Kd_A2=1.2<br>Kp_φ=1.2<br>Kd_φ=1.2 | Kp_A1=0.8<br>Kd_A1=0.8<br>Kp_A2=1.0<br>Kd_A2=1.0<br>Kp_φ=1.0<br>Kd_φ=1.0 |

| $\omega/2\pi$ \ $f2/f1$ | $f1-\Delta f/3 \sim f1+\Delta f/3$ | $f1+\Delta f/3 \sim f2/2-\Delta f/3$ | $f2/2-\Delta f/3 \sim f2/2+\Delta f/3$ |
|---|---|---|---|
| <1.999 | f_A1=500<br>f_A2=100<br>f_φ=100 | f_A1=500<br>f_A2=300<br>f_φ=300 | f_A1=800<br>f_A2=500<br>f_φ=500 |
| 1.999≤, ≤2.001 | f_A1=500<br>f_A2=500<br>f_φ=500 | f_A1=500<br>f_A2=500<br>f_φ=500 | f_A1=500<br>f_A2=500<br>f_φ=500 |
| >2.001 | f_A1=500<br>f_A2=900<br>f_φ=900 | f_A1=300<br>f_A2=700<br>f_φ=700 | f_A1=100<br>f_A2=500<br>f_φ=500 |

$\Delta f = (f2/2-f1)$

OSCILLATOR DEVICE, OPTICAL DEFLECTOR AND IMAGE FORMING APPARATUS USING THE SAME

TECHNICAL FIELD

This invention relates to a technique associated with the field of oscillator devices having a plurality of oscillators and, more particularly, to oscillator devices suitable for use as an optical deflecting device. In another aspect, the invention concerns a scanning display unit and an image forming apparatus such as a laser beam printer or a digital copying machine, using such optical deflecting device.

BACKGROUND ART

Resonance type optical deflecting devices having been proposed so far have the following advantageous features, as compared with optical scanning optical systems using a rotary polygonal mirror such as a polygon mirror: that is, the optical deflecting device can be made small in size; the electric power consumption is slow; and theoretically there is no surface tilt of the mirror surface.

On the other hand, since in the resonance type deflectors, in principle, the deflection angle (displacement angle) of the mirror changes sinusoidally and thus the angular speed is not constant. A technique for correcting such characteristic is disclosed in U.S. Pat. No. 7,271,943.

Figure 4:
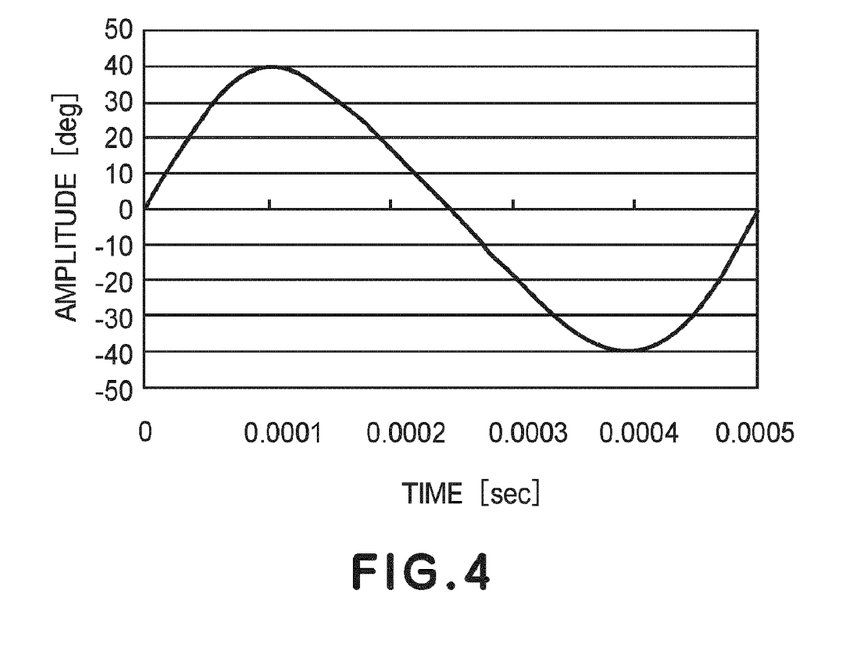
FIG. 4 is a graph showing changes with respect to time of a deflection angle of an oscillator device according to the present invention.

More specifically, U.S. Pat. No. 7,271,943 shows a microoscillator in which a system comprising a plurality of torsion springs and a plurality of movable elements has a plurality of discrete natural oscillation modes. In this microoscillator, the discrete natural oscillation modes include a reference oscillation mode which is a natural oscillation mode having a reference frequency and an even-multiple oscillation mode which is a natural oscillation mode having a frequency approximately an even-number-fold of the reference frequency. In U.S. Pat. No. 7,271,943, the microoscillator is oscillated with these oscillation modes by which sawtooth wave drive or the like is realized. Here, the sawtooth wave drive refers to such drive that, as shown in FIG. 4, during one period of the reciprocal motion of a movable element, the displacement time in the forward stroke differs from the time in the backward stroke.

Furthermore, U.S. Pat. No. 5,347,124 shows a system in which the deflection angle and its peak value of a reflecting mirror of an optical deflector are detected, and a driving signal of the optical deflector is controlled based on these. More specifically, a variable resistance element of a differentiating circuit which constitutes a PID operating circuit is adjusted to thereby optimize the amplitude of the reflecting mirror of the resonance type optical deflector and the vibrational state thereof.

DISCLOSURE OF THE INVENTION

In the aforementioned U.S. Pat. No. 7,271,943, an oscillator device having a plurality of oscillation modes is driven. Since, however, the resonance frequency of the oscillator device fluctuates due to manufacturing dispersion or environmental changes such as temperature, for example, it is inevitable to provide feedback control responsive to such fluctuation.

However, the response characteristic of the oscillator device to a driving signal is different by from device to device. Thus, there is an inconvenience that, if the feedback control with the same control parameter is performed regardless of the resonance frequency, adequate control effect is unattainable and stable driving is unachievable.

The present invention accomplishes stable driving by adjusting a control parameter in dependence upon the deviation of resonance frequency of the oscillator device.

In accordance with an aspect of the present invention, there is provided an oscillator device includes a supporting member, an oscillation system having plural oscillators and plural torsion springs, a driving device for oscillating the oscillation system, a drive control device for controlling the driving device, an oscillation detecting device for detecting a state of oscillation of an oscillator of the oscillation system, a resonance frequency calculating device for calculating a resonance frequency of the oscillation system based on an output of the oscillation detecting device, and a control parameter adjusting device for adjusting a control parameter of the drive control device, wherein the control parameter adjusting device adjusts a control parameter based on an output of the resonance frequency calculating device.

In accordance with another aspect of the present invention, there is provided an oscillator device which comprising: a supporting member; an oscillation system including at least a first oscillator, a second oscillator, a first torsion spring configured to connect the first and second oscillators with each other, a second torsion spring connected to the second oscillator and having a torsional axis aligned with a torsional axis of the first torsion spring; a driving device configured to oscillate the first oscillator and the second oscillator about the first and second torsional axes; a drive control device configured to control said driving device; an oscillation detecting device configured to detect a state of oscillation of at least one of the first oscillator and the second oscillator; a resonance frequency calculating device configured to calculate a resonance frequency of said oscillation system based on an output of said oscillation detecting device; and a control parameter adjusting device configured to adjust a control parameter of said drive control device; wherein said drive control device supplies a driving signal to said driving device so that at least one of the first oscillator and the second oscillator is brought into a state of oscillation which can be represented by an equation including at least a term $A_1 \sin \omega t + A_2 \sin(n\omega t + \phi)$ where n is an integer not less than 2, and wherein said control parameter adjusting device adjusts the control parameter based on an output of said resonance frequency calculating device.

In one preferred form of this aspect of the present invention, said control parameter adjusting device adjusts the control parameter based on an output of said resonance frequency calculating device and an angular frequency of the driving signal.

The control parameter adjusting device may adjust at least one of a proportional gain, an integral gain and a derivative gain which are PID control parameters, and said drive control device may perform feedback control based on at least one of the proportional gain, the integral gain and the derivative gain.

The control parameter adjusting device may include a table having stored therein PID control parameters corresponding to the resonance frequency of said oscillation system, and said control parameter adjusting device may choose a PID control parameter based on an output of said resonance frequency calculating device to adjust the control parameter.

The control parameter adjusting device may include a table having stored therein PID control parameters corresponding to the resonance frequency of said oscillation system and the angular frequency of the driving signal, and said control parameter adjusting device may choose a PID control parameter based on an output of said resonance frequency calculating device and the driving angular frequency to adjust the control parameter.

The drive control device may include a band-limiting filter, and the frequency to be band-limited may be adjusted by said control parameter adjusting device.

The control parameter adjusting device may include a table having stored therein a frequency to be band-limited, corresponding to the resonance frequency of said oscillation system, and said control parameter adjusting device may choose a frequency to be band-limited, based on an output of said resonance frequency calculating device to adjust the control parameter.

The control parameter adjusting device may include a table having stored therein a frequency to be band-limited, corresponding to the resonance frequency of said oscillation system and the angular frequency of the driving signal, and said control parameter adjusting device may choose a frequency to be band-limited, based on an output of said resonance frequency calculating device and the angular frequency of the driving signal, to adjust the control parameter.

The driving control device may supply to said driving device a driving signal which is represented by an equation including at least a term $B_1 \sin \omega t + B_2 \sin(n\omega t + \psi)$.

The oscillation detecting device may detect at least one of $A_1$, $A_2$ and $\phi$ which are coefficients representing the state of oscillation of at least one of the first oscillator and the second oscillator, and said drive control device may adjust at least one of $B_1$, $B_2$ and $\psi$ of the driving signal so that at least one of the $A_1$, $A_2$ and $\phi$ takes a predetermined value.

In accordance with a further aspect of the present invention, there is provided an optical deflector, comprising: an oscillator device as recited above; and a reflection surface formed on at least one of the first oscillator and the second oscillator.

In accordance with a yet further aspect of the present invention, there is provided an image forming apparatus, comprising: a light source; an optical deflector as recited above; and a photosensitive member; wherein said optical deflector is configured to deflect light from said light source so that at least a portion of the light is projected on said photosensitive member to form a latent image thereon.

In summary, in an oscillator device according to the present invention, more stable oscillation can be realized by adjusting a control parameter in dependence upon the deviation of resonance frequency of the oscillator device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 6A-6C are graphs showing the relationship between the gain and the driving angular frequency in an oscillator device according to the present invention, as well as the relationship between the phase difference and the driving angular frequency, wherein FIG. 6A illustrates the relationship between $B_1$ and $A_1$, FIG. 6B illustrates the relationship between $B_2$ and $A_2$, and FIG. 6C illustrates the relationship between $\psi$ and $\phi$.

FIGS. 7A-7C are graphs showing the relationship between the gain and the driving angular frequency in an oscillator device according to the present invention, as well as the relationship between the phase difference and the driving angular frequency, wherein FIG. 7A illustrates the relationship between $B_1$ and $A_1$, FIG. 7B illustrates the relationship between $B_2$ and $A_2$, and FIG. 7C illustrates the relationship between $\psi$ and $\phi$.

BEST MODE FOR PRACTICING THE INVENTION

Oscillator Device

Figure 1:
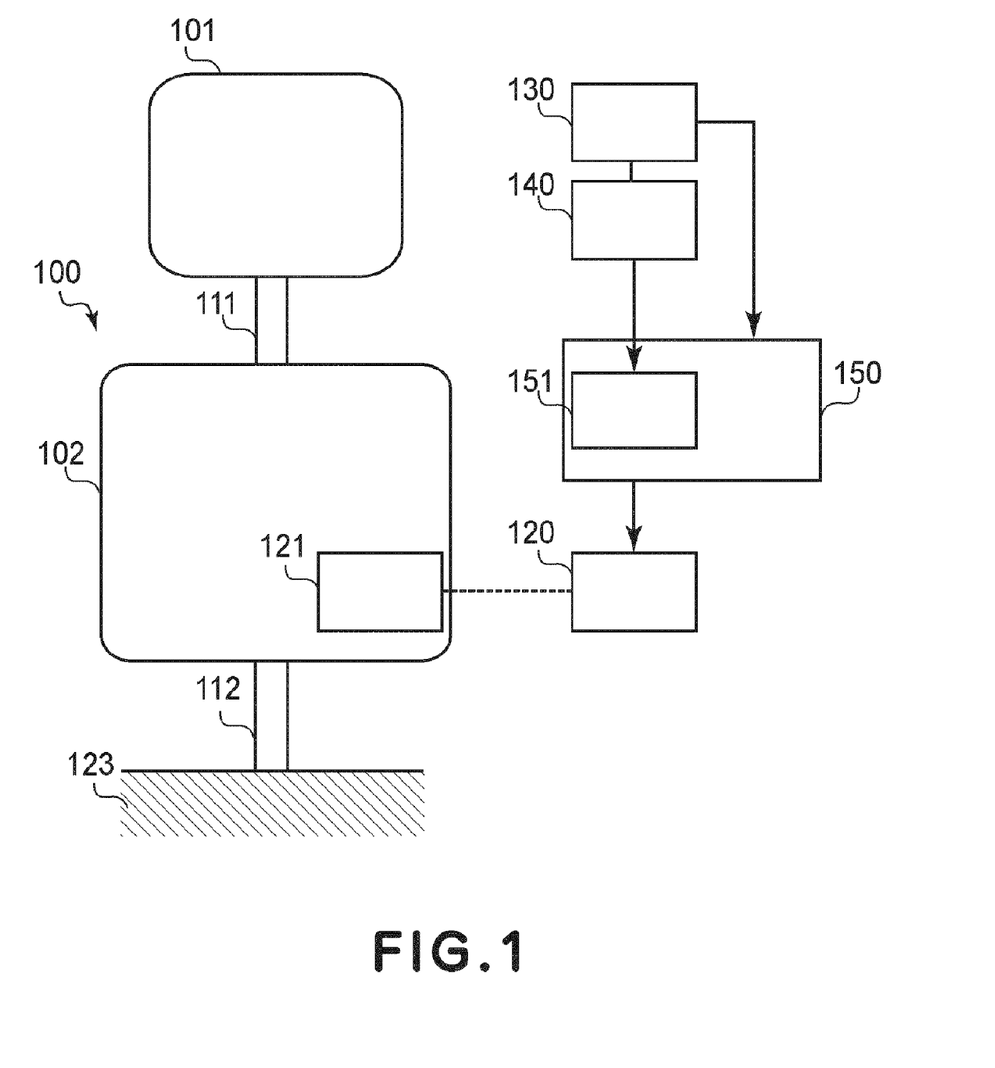
FIG. 1 is a block diagram of an oscillator device according to the present invention.

FIG. 1 shows an oscillator device according to one preferred embodiment of the present invention. This oscillator device of the present invention comprises an oscillation system 100 and a supporting member 123 for supporting the oscillation system 100. The oscillation system 100 comprises at least a first oscillator 101, a second oscillator 102, a first torsion spring 111 and a second torsion spring 112. The first torsion spring 111 connects the first oscillator 101 and the second oscillator 102 with each other. The second torsion spring 112 connects the second oscillator 102 and a supporting member 123 with each other so that it has a torsional axis aligned with a torsion axis of the first torsion spring 111.

Furthermore, when the oscillator device of the present embodiment is used as an optical deflecting device, a reflection surface is formed on at least one oscillator. With regard to such reflection surface, a light reflecting film may be formed on the surface of the oscillator. If the surface of the oscillator is sufficiently smooth, it can be used as the reflection surface without the provision of a light reflecting film.

The principle of operation of the oscillator device according to the present invention is basically the same as that disclosed in the aforementioned U.S. Pat. No. 7,271,943. Generally, an equation of free oscillation of an oscillation system including oscillators of a number n and torsion springs of a number n is given as follows.

$$M\ddot{\theta} + K\theta = 0$$

$$\theta = \begin{pmatrix} \theta_1 \\ \theta_2 \\ \vdots \\ \theta_n \end{pmatrix}, \quad M = \begin{pmatrix} I_1 & & & \\ & I_2 & & \\ & & \ddots & \\ & & & I_n \end{pmatrix},$$

-continued $$K = \begin{pmatrix} k_1 & -k_1 & & \\ -k_1 & k_1+k_2 & -k_2 & \\ & & \ddots & \\ & & -k_{n-1} & k_{n-1}+k_n \end{pmatrix}$$

wherein $I_k$ is the inertia moment of the oscillator, $k_k$ is the spring constant of the torsion spring, and $\theta_k$ is the torsion angle of the oscillator (k=1, ..., n). If the eigen value of $M^{-1}K$ of this system is denoted by $\lambda_k$ (k=1 to n), the angular frequency (driving frequency) $\omega_k$ of the natural oscillation mode is given by $\omega_k=\sqrt{(\lambda_k)}$.

The oscillator device of the present invention is so arranged that, in an oscillation system having oscillators of a number n, torsion springs of a number n and oscillation modes of a number n, a fundamental frequency and frequencies of a number n−1 and being integer-fold the fundamental frequency are included in these $\omega_k$ by which various motions of the oscillators are enabled. It should be noted that, in the present invention, the "integer-fold" includes an approximately integral multiple, and that the approximately integral multiple refers to a numerical value range of about 0.98 n to 1.02 n times the fundamental frequency, where n is a natural number not less than 2.

In this embodiment, the oscillation system may comprise two oscillators and two torsion springs, and $\omega_k$ may include a fundamental frequency and a frequency of approximately even-number multiple of the fundamental frequency. With this arrangement, approximately constant angular-speed driving in which the drift of the angular speed of the oscillator is well suppressed in a predetermined range can be realized.

Driving Means and Drive Control

The oscillator device according to the present embodiment comprises driving means 120 and 121 which applies a driving force to the oscillation system 100, and drive control means 150 for adjusting the driving means 120. The driving means 120 and 121 drives the oscillation system so that at least one of the plural oscillators produces oscillation which is expressed by an equation including at least a term $A_1 \sin \omega t + A_2 \sin(n\omega t+\varnothing)$ where n is an integer not less than 2. In that occasion, the drive control means supplies to the driving means a driving signal presented by an equation including at least a term $B_1 \sin \omega t + B_2 \sin(n\omega t+\psi)$ where n is an integer not less than 2.

The driving means 120, 121 has a structure based on an electromagnetic system, an electrostatic system or a piezoelectric system, for example, to apply a driving force to the oscillation system. In the case of electromagnetic driving, as an example, a permanent magnet may be provided on at least one oscillator and an electric coil for applying a magnetic field to this permanent magnet may be disposed adjacent the oscillator. The disposition of the permanent magnet and the electric coil may be reversed. In the case of electrostatic driving, an electrode may be formed on at least one oscillator, and an electrode for providing an electrostatic force acting between it and this electrode may be formed adjacent the oscillator. In the case of piezoelectric driving, a piezoelectric element may be provided in the oscillation system or on the supporting member to apply a driving force.

Oscillation Detecting Means

The oscillation detecting means 130 detects the state of oscillation of the oscillator. The oscillation detecting means 130 is comprised a photodetector, for example, and it receives reflected light of a light beam having been incident on at least one of the first oscillator and the second oscillator. The state of oscillation of the oscillator 101 can detected based on the output signal from this photodetector.

Figure 2A:
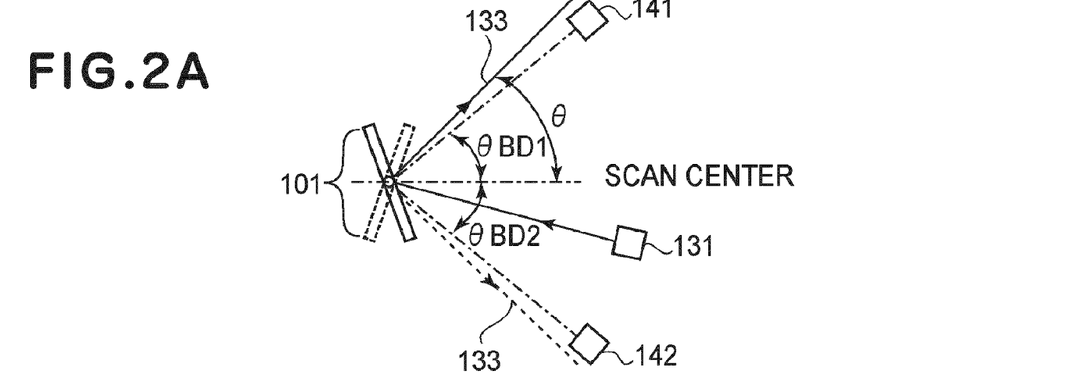
FIG. 2A-2C are diagrams for explaining the positional relationship between an oscillator device according to the present invention and a photodetector.

Furthermore, as an example, the photodetector may be disposed as follows. Namely, as shown in FIG. 2A, first and second photodetectors 141 and 142 may be disposed at first and second displacement angles θBD1 and θBD2 adjacent the scan end.

Figure 2B:
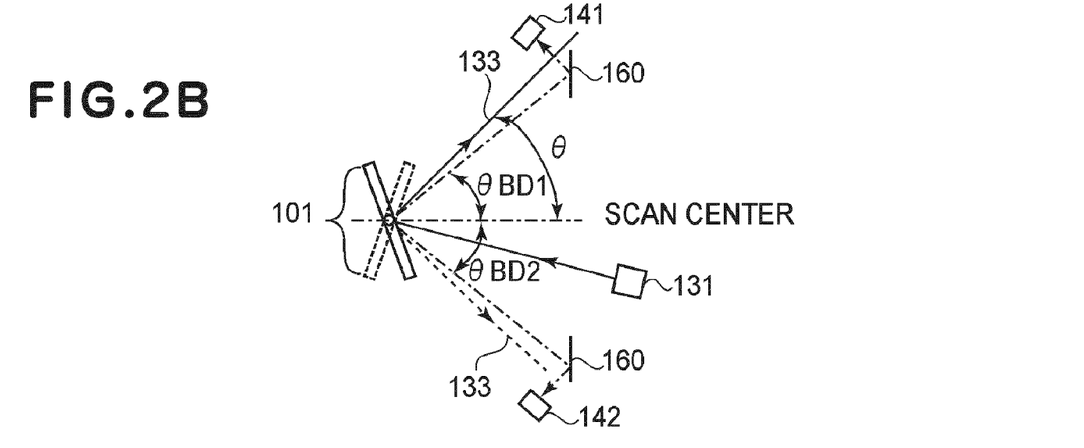

As a further alternative, as shown in FIG. 2B, reflection members 160 may be provided at first and second displacement angles θBD1 and θBD2, and lights (reflected lights) reflected by these reflection members 160 are detected by first and second photodetectors 141 and 142, respectively.

Figure 2C:
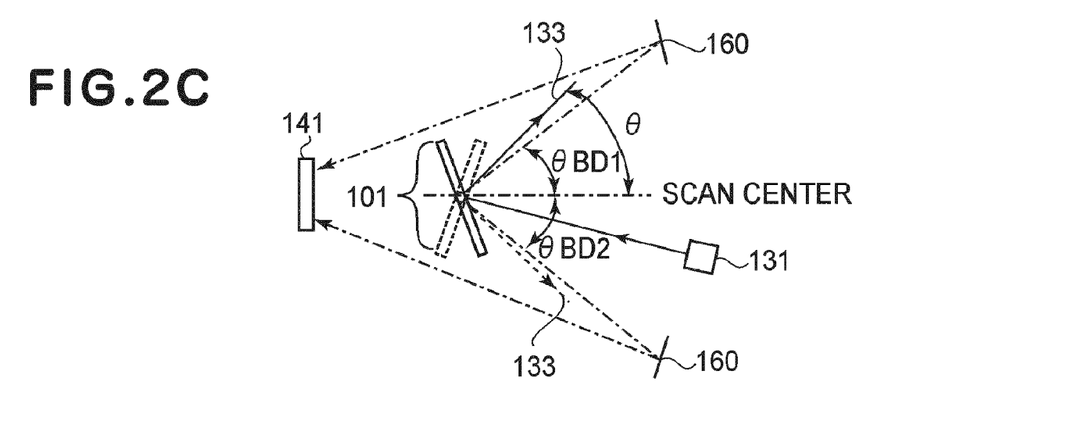

Furthermore, as shown in FIG. 2C, reflection members 160 may be provided at first and second displacement angles θBD1 and θBD2, and lights (reflected lights) reflected by these reflection members 160 are detected by a single photodetector 141. In that occasion, as shown in FIG. 2C, the photodetector may be positioned in a portion at a side of the oscillator remote from the light source or, alternatively, it may be disposed on the same side as the light source.

Namely, the first photodetector may be disposed at the irradiation position of the scanning light when the oscillator takes the first displacement angle, and the second photodetector may be disposed at the irradiation position of the scanning light when the oscillator takes the second displacement angle. The first and second photodetectors may be one and the same element, or they may be different elements. Furthermore, the scanning light may be directly incident on the photodetecting element or, alternatively, reflection light coming via at least one reflection member may be incident on the photodetector. In short, at least one photodetector should be disposed to receive scanning light at the first and second displacement angles.

Furthermore, as shown in FIG. 2A, if the scan center (in a stationary state) is denoted by 0 while an absolute value of the maximum scan angle (maximum deflection angle) 133 is denoted by 1, the photodetector 142 should preferably be disposed within a range of the absolute value of the scan angle from not less than 0.6 to not greater than 1.0. Particularly, the photodetector should preferably be disposed around 0.8.

In this embodiment, $A_1$, $A_2$ and ∅ which are coefficients representing the state of oscillation of the oscillator are calculated by use of an operating circuit of the drive control means 150, based on a signal from the aforementioned photodetector.

It should be noted that, although in this embodiment the displacement of the oscillator is detected by means of a photodetector, any other detection method may be used: for example, a method using piezo-sensors mounted on the torsion springs 111 and 112; a method using electrostatic capacitance sensors; and a method using magnetic sensors.

Resonance Frequency Calculating Means

The resonance frequency calculating means 140 will be described below. The resonance frequency calculating means 140 calculates the resonance frequency (fundamental frequency f1 and a frequency f2 approximately two-fold the fundamental frequency) of the oscillators, based on an output of the oscillation detecting means. The resonance frequency can be calculated as follows: a driving signal of single sinusoidal-wave shape from is applied from the driving means to the oscillation system while sweeping with the frequency around a presumed resonance frequency, and the frequency of the driving signal with which the amplitude of the oscillator reaches a maximum is taken as the resonance frequency.

Furthermore, it may be detected in such manner that: after driving the oscillator, it is stopped and the resonance frequency is detected based on the damping of the oscillator. In that occasion, the resonance frequency can be measured from the back electromotive force of the driving coil, for example.

Drive Control Means

The drive control means 150 is so structured that: based on the output of the oscillation detecting means 130, it controls the driving means to produce a driving signal which includes at least a term $B_1 \sin \omega t + B_2 \sin(n\omega t + \psi)$ to cause the oscillation system to produce desired oscillatory motion. The driving signal is applied to the oscillation system by the driving means.

Figure 3A:
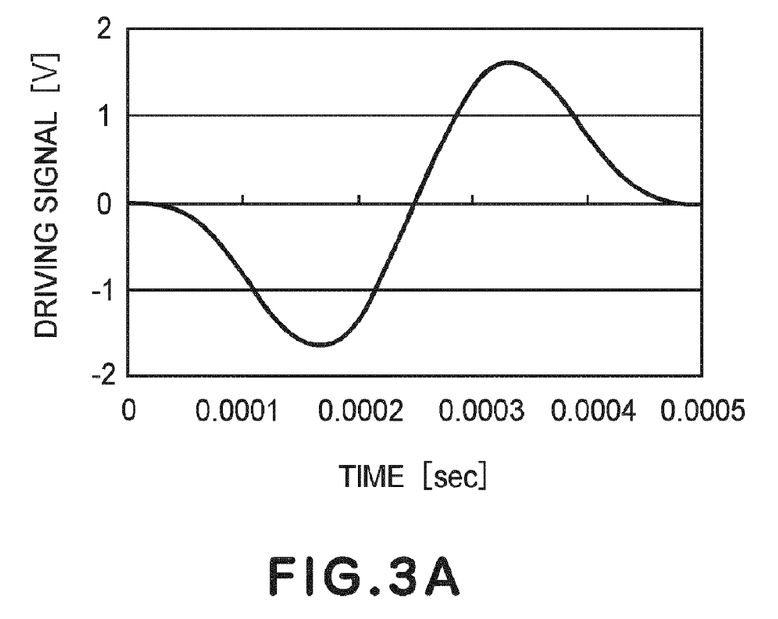
FIG. 3A and FIG. 3B are graphs showing an example of a driving signal for driving an oscillator device according to the present invention.
Figure 3B:
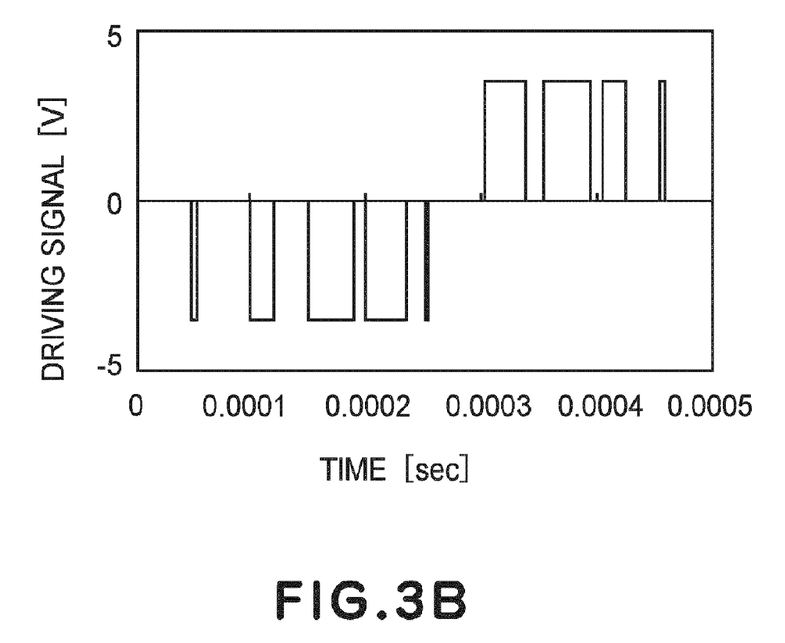

For example, the driving signal may be a driving signal provided by synthesizing sinusoidal waves (FIG. 3A) or it may be a pulse-shaped driving signal (FIG. 3B). In the case of a driving signal provided by synthesizing sinusoidal waves, a desired driving signal can be obtained by adjusting the amplitude and phase of each sinusoidal wave. Furthermore, if a pulse-shaped signal is used to make the driving, a desired driving signal can be generated by changing the number of pulses, pulse spacing and pulse width, for example, with respect to time. In addition to these, any other methods may be used if the driving signal can produce driving by which the deflection angle of the optical deflecting device takes a desired deflection angle.

By applying the aforementioned driving signal to the drive control means, the oscillator device can be oscillated as shown in FIG. 4. It should be noted that, when the oscillator device according to the present embodiment is driven with the aforementioned driving signal, the driving signal and the oscillation of the oscillator will have a phase shift of about 180 degrees, as shown in FIG. 3A and FIG. 4.

Figure 5:
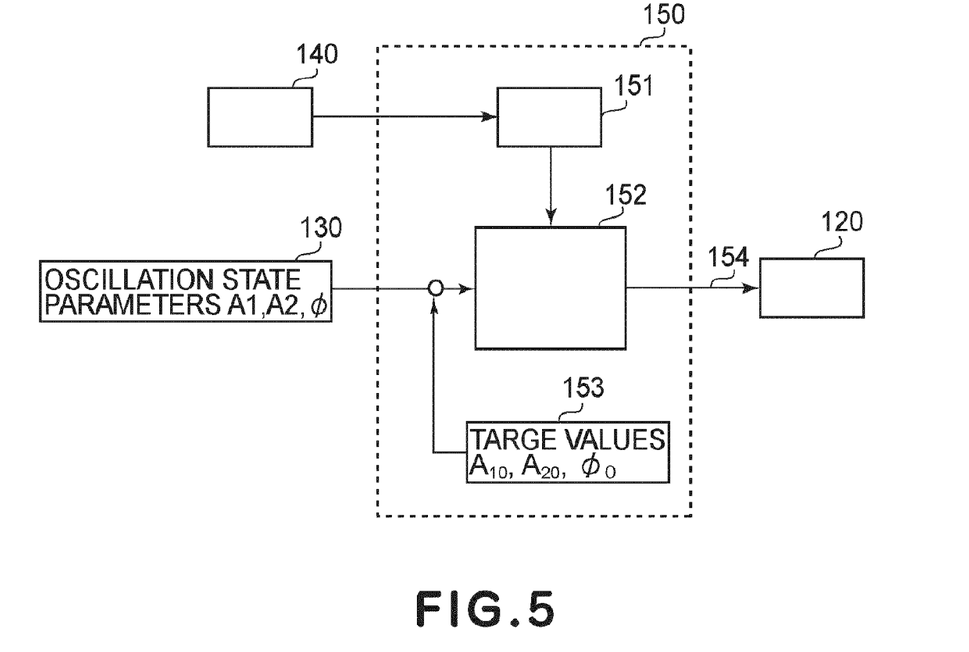
FIG. 5 is a block diagram related to the control of an oscillator device according to the present invention.

FIG. 5 shows a block diagram concerning the control made in the present embodiment. The oscillation system 100 oscillates in response to the driving force applied from the driving means 120. The state of oscillation is detected by the oscillation detecting means 130, and three parameters $A_1$, $A_2$ and ø so calculated as well as difference of them with the target value 153 are inputted into a driving signal calculating means 152. Furthermore, a control parameter adjusting means 151 determines control parameters, that is, a proportional gain, an integral gain and a derivative gain (PID control parameters) based on the resonance frequency having been calculated by the resonance frequency calculating means 140, and then it supplies them to a driving signal calculating means 152. The driving signal calculating means 152 performs proportion, differentiation and/or integral control (PID control) to each parameter of the oscillation state, and calculates a driving signal 154. The thus calculated driving signal 154 is supplied to the driving means 120.

Control Example 1

A few control examples in the present embodiment will be explained below.

Figure 6A:
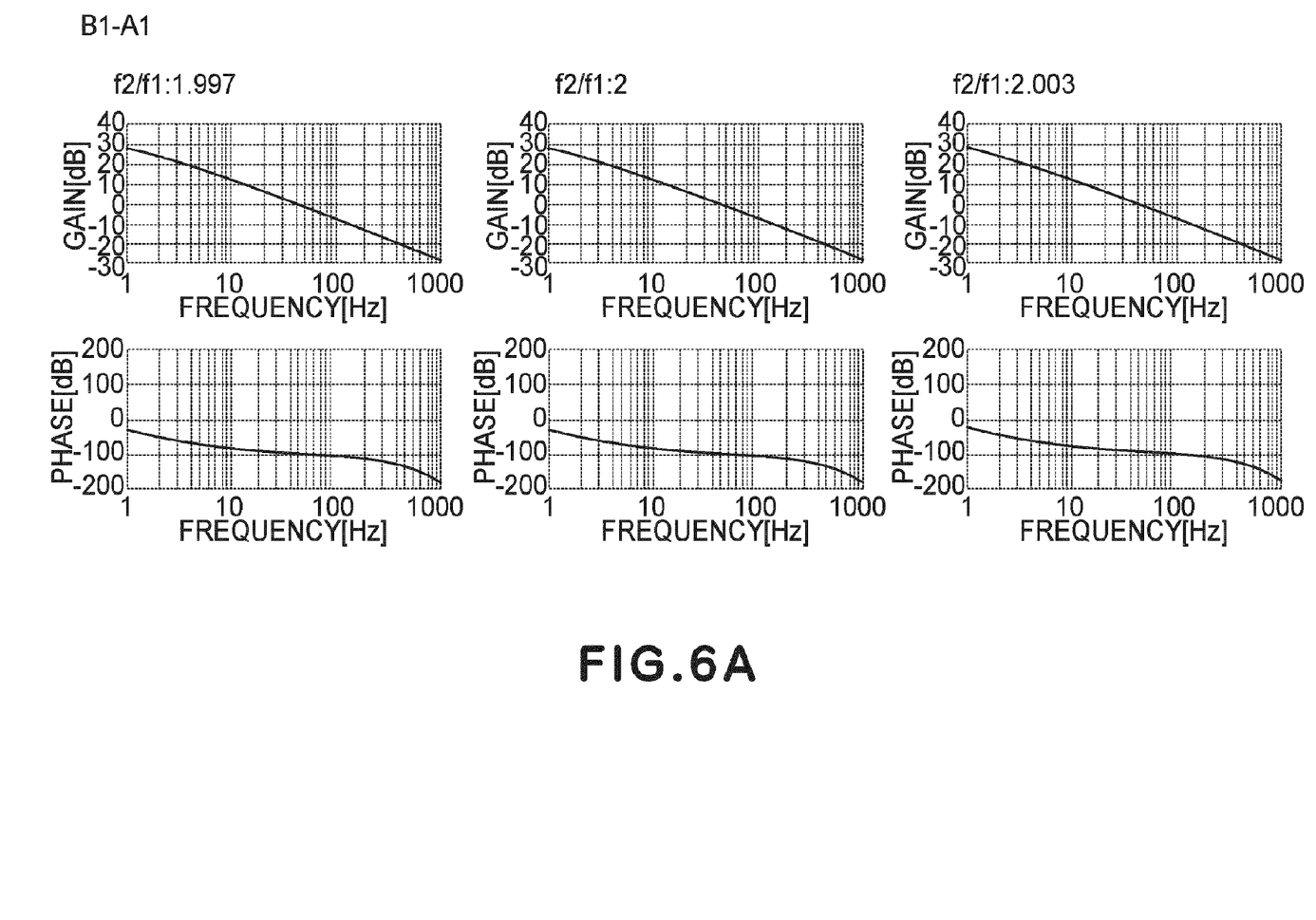
Figure 6B:
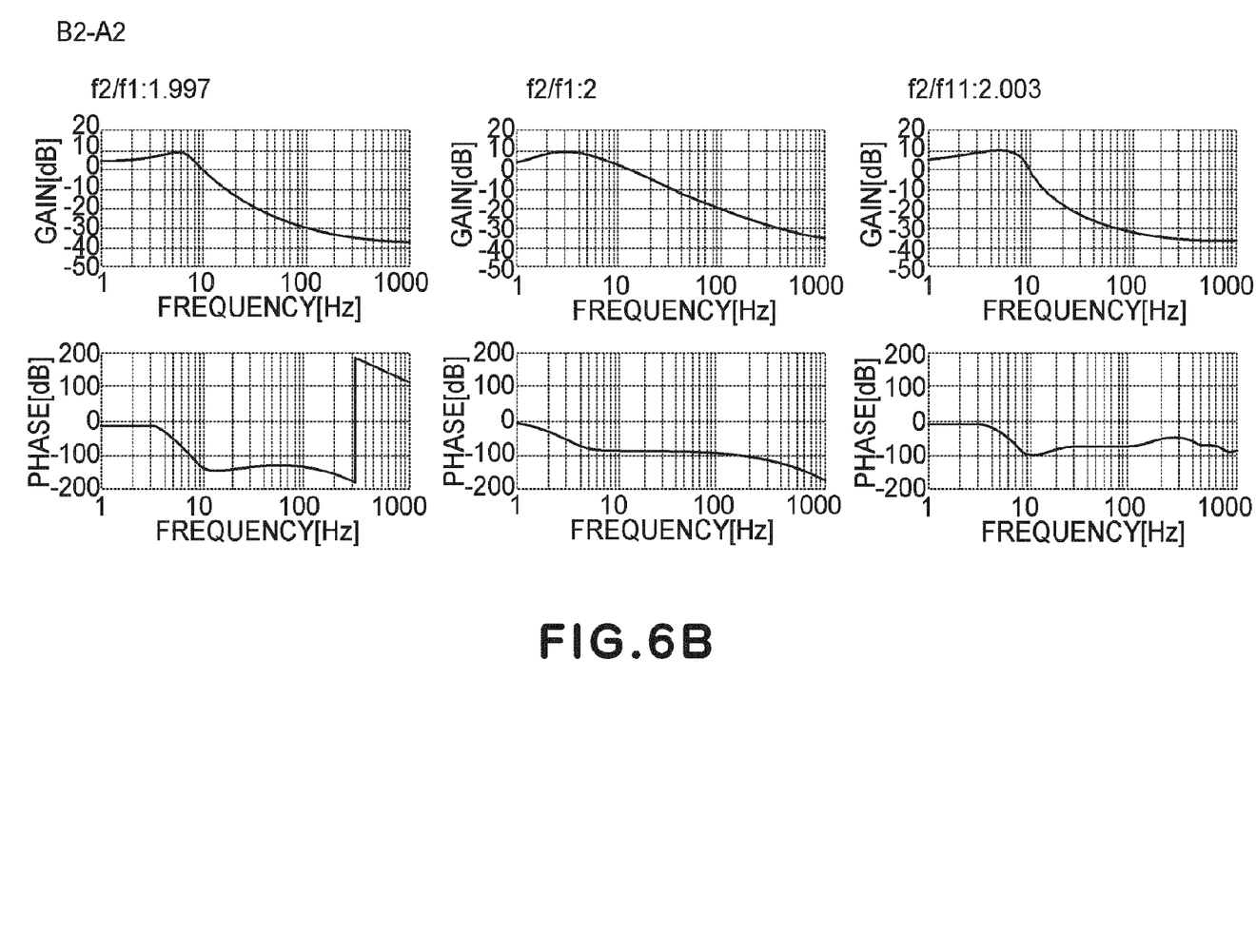
Figure 6C:
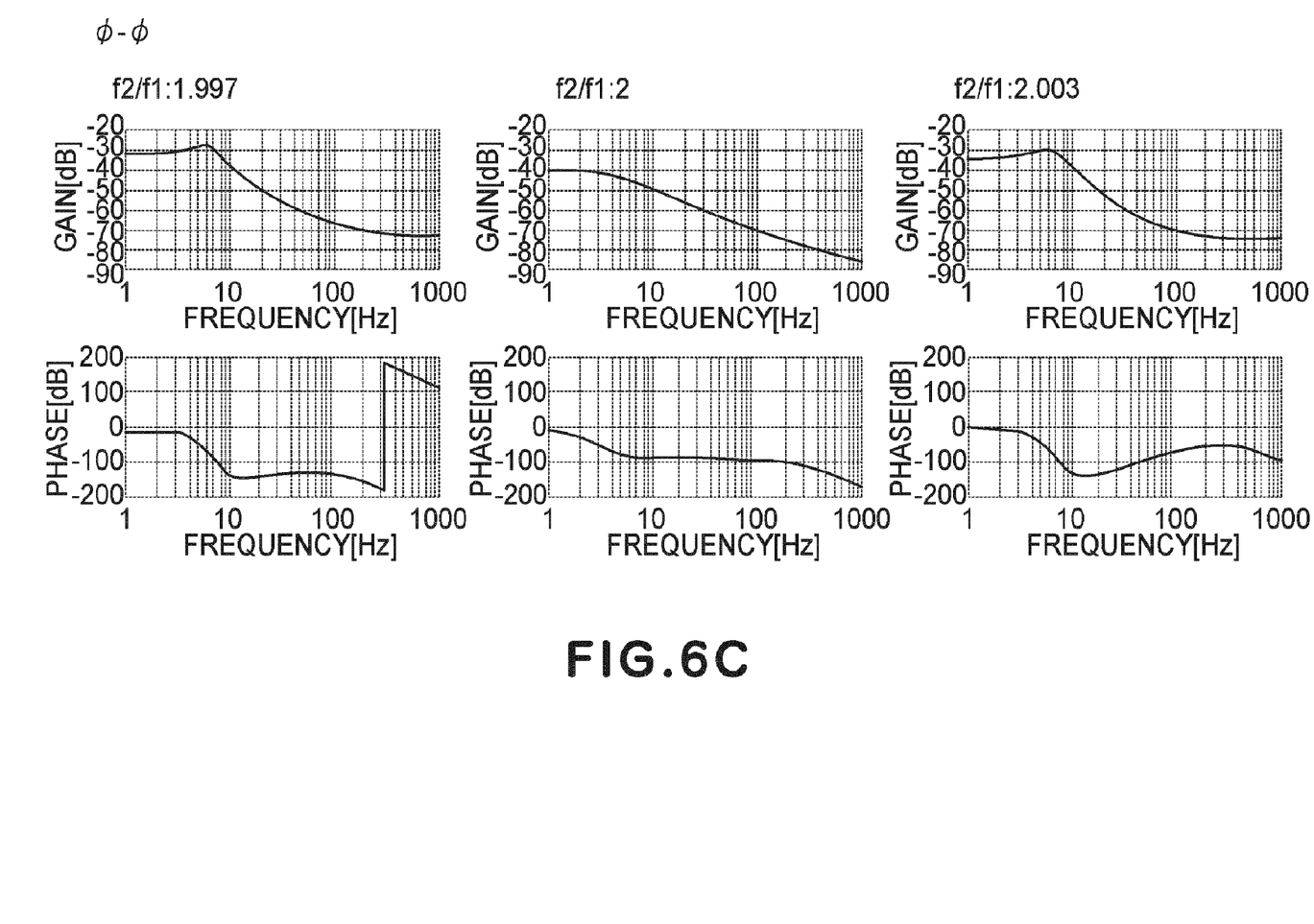

The angular frequency (driving angular frequency) ω of the driving signal is made assumed here to be the fundamental frequency f1 of the oscillation system 100. On the other hand, FIGS. 6A-6C are Bode diagrams illustrating the transfer characteristic of the controlled system and the relationship of two resonance frequencies f1 and f2 of the oscillation system 100. Here, the relationship of two resonance frequencies refers to the ratio of the fundamental frequency f1 and the resonance frequency f2 which is approximately two-fold the fundamental frequency. FIGS. 6A-6C each illustrate three cases wherein f2/f1 is 1.997, 2 and 2.003, respectively.

The transfer characteristic of the controlled system corresponds to the relationship between the driving signal and the oscillation of oscillator 101. FIG. 6A illustrates the transfer characteristics from $B_1$ which is the parameter of the driving signal to $A_1$ which is the parameter of the oscillation state. Similarly, FIG. 6B illustrates the transfer characteristics from $B_2$ which is the parameter of the driving signal to $A_2$ which is the parameter of the oscillation state. Similarly, FIG. 6C illustrates the transfer characteristics from ψ which is the parameter of the driving signal to ø which is the parameter of the oscillation state.

As shown in FIG. 6A, comparing the cases where f2/f1 is 1.997, 2 and 2.003, the transfer characteristic from $B_1$ to $A_1$ is approximately unchanged. On the other hand, when the relationship of f2/f1 deviates from 2 by ±0.3% as shown in FIG. 6B and FIG. 6C, the transfer characteristic from $B_2$ to $A_2$ and the transfer characteristic from ψ to ø change largely. It is seen from these results that a satisfactory oscillation state would be unattainable if the feedback control with the same control parameter is carried out regardless of the resonance frequency. In consideration of this, in this embodiment, the control parameter adjusting means 151 adjusts the control parameters $A_2$ and ø of the drive control means 150 on the basis of the output of the resonance frequency calculating means 140. By this adjustment of the control parameters through the control parameter adjusting means 151, a satisfactory oscillation state can be accomplished with regard to $A_2$ and ø as well.

In this embodiment, if f2/f1 is less than 2, the proportional gain and the derivative gain are moved down. If f2/f1 is larger than 2, the proportional gain and derivative gain are put up. In this manner, stable oscillation can be achieved as compared with the case wherein the control parameters are fixed.

Figure 8:
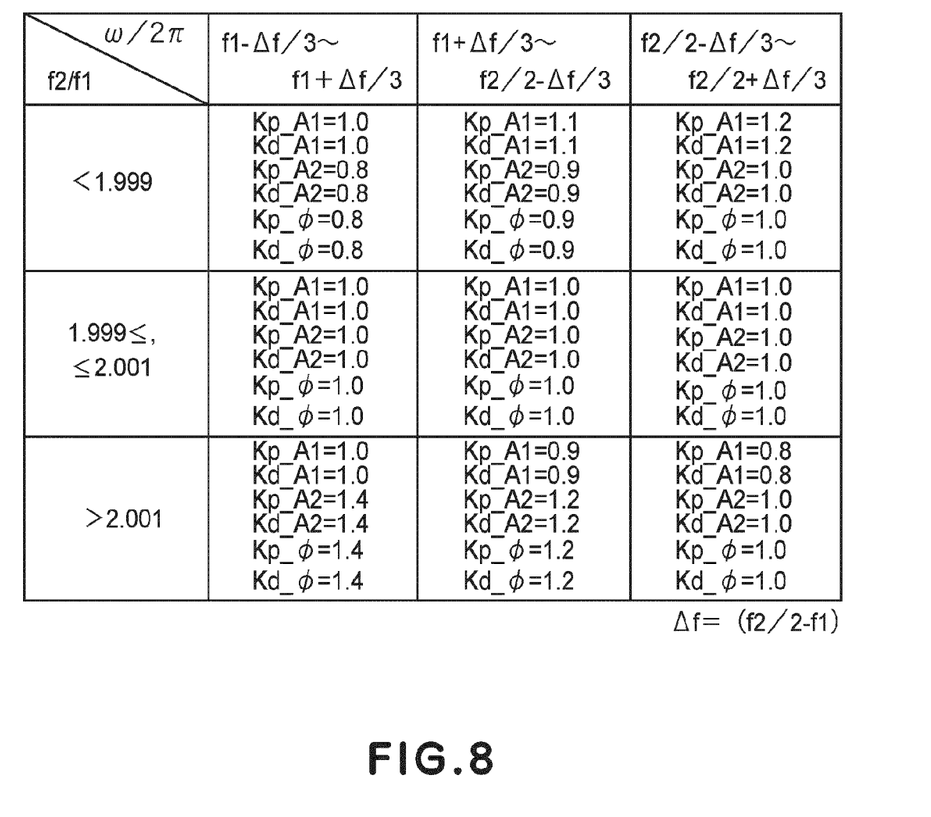
FIG. 8 shows an example of a feedback coefficient table of an oscillator device according to the present invention.

In this control, a feedback coefficient may be selected out of a table having stored therein PID control parameters corresponding to the resonance frequency of the oscillation system, such as shown in FIG. 8, for example. This table may be memorized in the control parameter adjusting means 151. Here, Kp denotes the proportional gain and Kd denotes the derivative gain. Similarly, _A1, _A2 and _ø denote the parameters of the oscillation state. For example, "Kp_A1" denotes the proportional gain of $A_1$ among the output signal of the oscillation detecting means 130. It should be noted that the table shown in FIG. 8 is a mere example, and a table specifying further details about f2/f1 and ω/2π may be used.

Control Example 2

Next, a control example in a case where the driving angular frequency ω is at an arbitrary frequency around the fundamental frequency f1, will be described below.

Figure 7A:
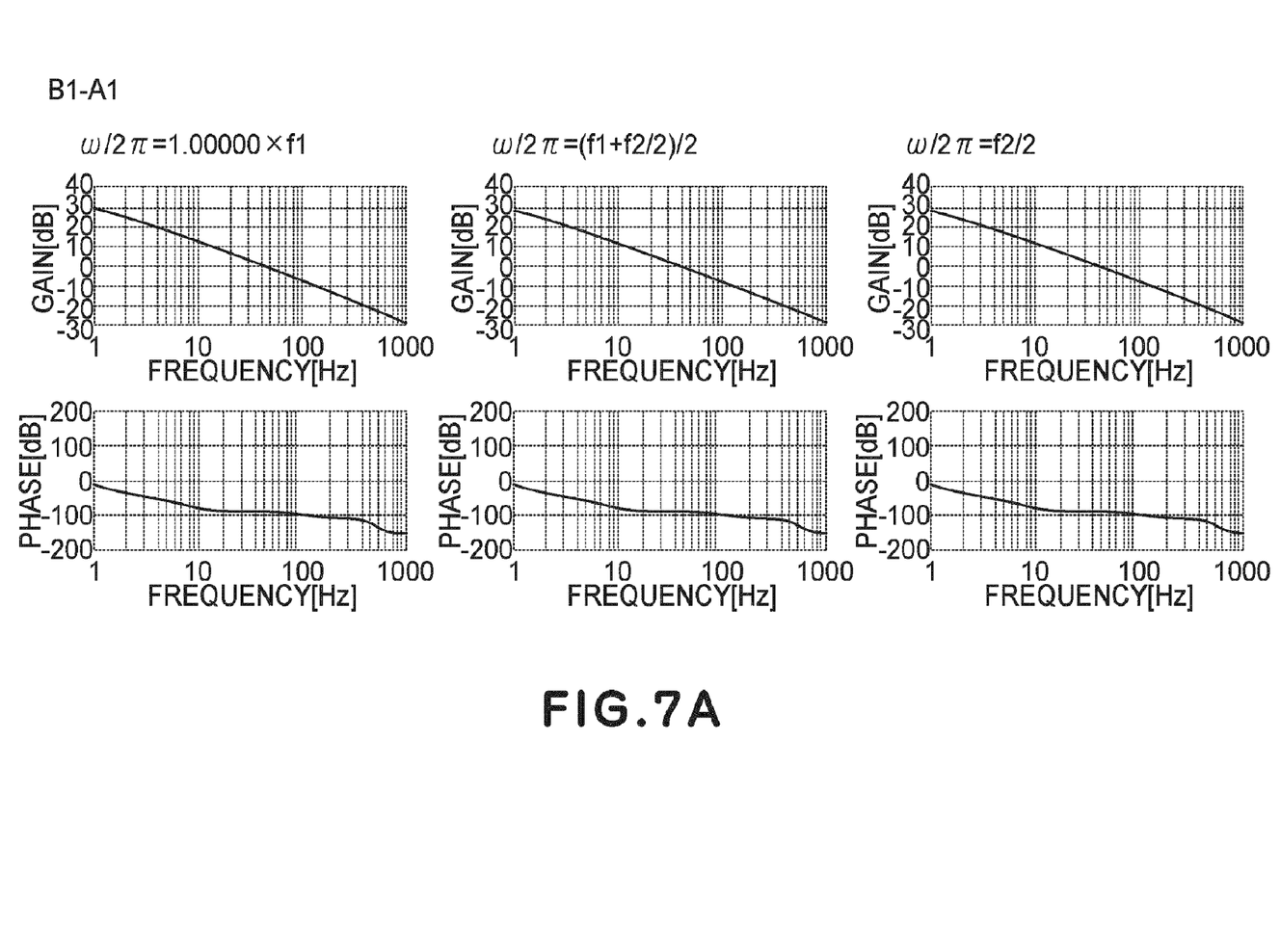
Figure 7B:
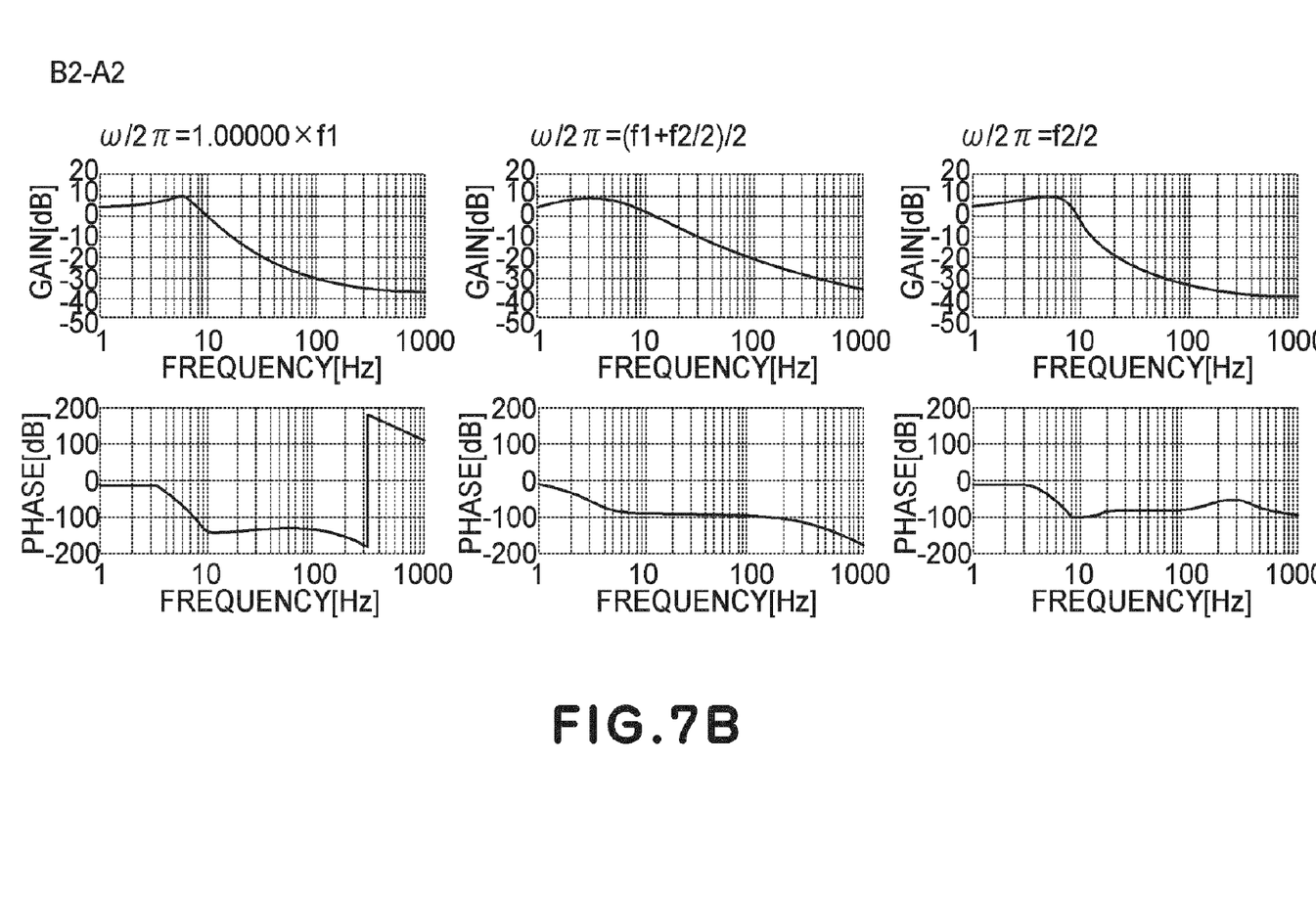
Figure 7C:
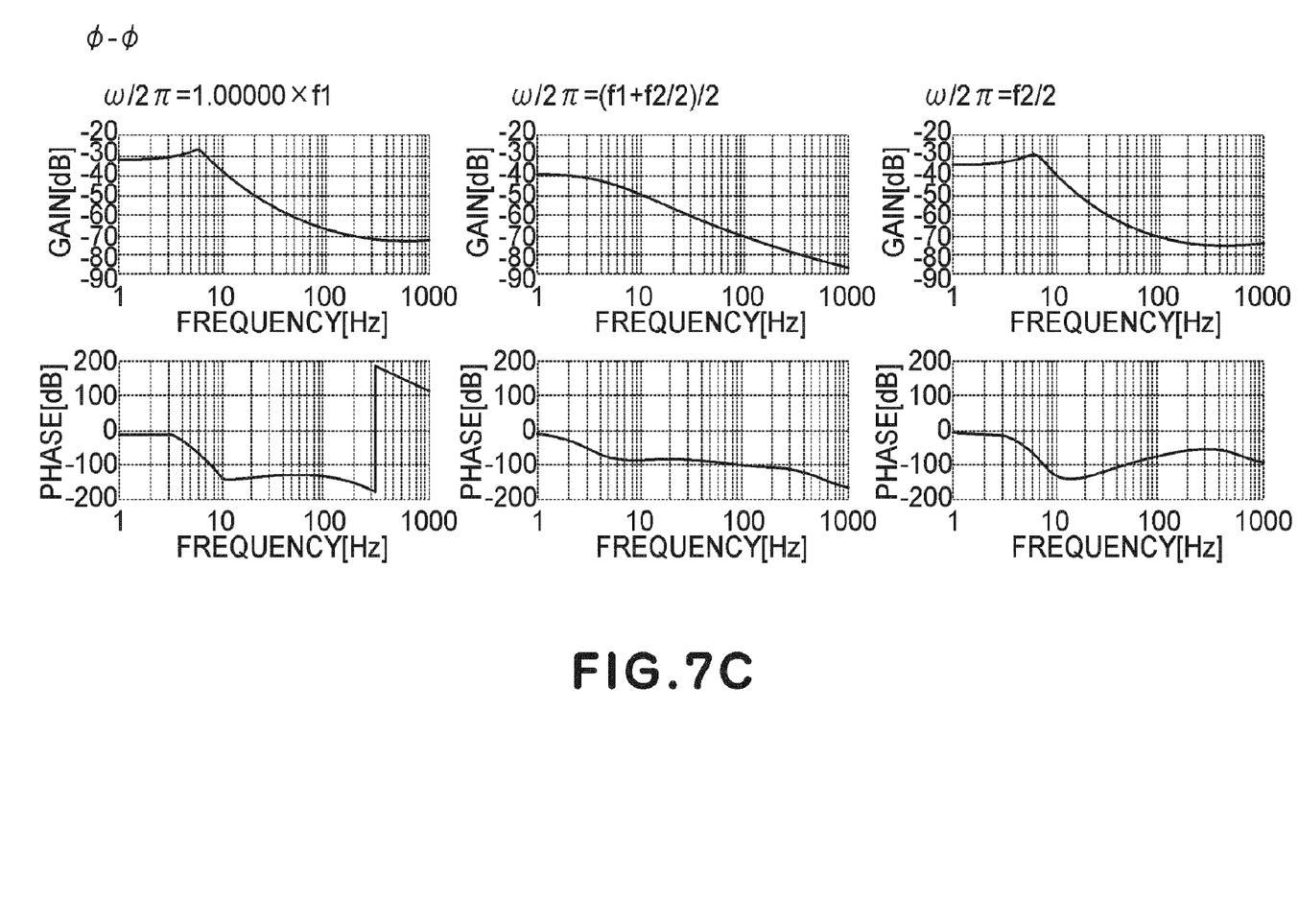

FIGS. 7A-7C are Bode diagrams illustrating the relationship between the transfer characteristics of the controlled system of this case and the driving angular frequency ω. FIGS. 7A-7C shows an example wherein f2/f1 is 2.003. The transfer characteristic of the controlled system corresponds to the relationship between the driving signal and the oscillation of the oscillator 101. FIG. 7A illustrates the transfer characteristics from $B_1$ which is the parameter of the driving signal to $A_1$ which is the parameter of the oscillation state. Similarly, FIG. 7B illustrates the transfer characteristics from $B_2$ which is the parameter of the driving signal to $A_2$ which is the parameter of the oscillation state. Similarly, FIG. 7C illustrates the transfer characteristics from ψ which is the parameter of the driving signal to ø which is the parameter of the oscillation state. FIGS. 7A-7C are Bode diagrams of a case where ω/2π=1.00000*f1, ω/2π=1.00075*f1(ω/2π=(f1+f2/2)/2), and ω/2π=1.00150*f1(ω/2π=f2/2).

In FIG. 7A, the transfer characteristics from $B_1$ to $A_1$ is approximately unchanged if the driving angular frequency shifts minutely. However, as shown in FIGS. 7B and 7C, when the driving angular frequency shifts minutely, the transfer characteristics from $B_2$ to $A_2$ and the transfer characteristics from ψ to ø change largely. It is seen from these results that a satisfactory oscillation state would be unattainable if the feedback control with the same control parameter is carried out regardless of the driving angular frequency. In consideration of this, in this embodiment, the control parameter adjusting means 151 adjusts the control parameters $A_2$ and ø of the drive control means 150 on the basis of the output of the resonance frequency calculating means 140 and the value of the driving angular frequency ω. Here, the driving angular frequency ω is obtainable from the drive control means 150 which is producing the driving signal. By this adjustment of the control parameters through the control parameter adjusting means 151, a satisfactory oscillation state can be accomplished with regard to $A_2$ and ø as well.

In this embodiment, if the driving angular frequency ω is greater than f1, the proportional gain and the derivative gain are moved down. If the driving angular frequency ω is less than f1, the proportional gain and derivative gain are put up. In this manner, stable oscillation can be achieved as compared with the case wherein the control parameters are fixed.

The control parameter adjusting means 151 of this embodiment adjusts the control parameters of the drive control means 150 on the basis of the output of the resonance frequency calculating means 140 and the driving angular frequency ω (it may be a driving frequency ω/2π). In this control, a feedback coefficient may be selected out of a table having stored therein PID control parameters corresponding to the resonance frequency of the oscillation system and the angular frequency of the driving signal, such as shown in FIG. 8, for example. This table may be memorized in the control parameter adjusting means 151. Here, Kp denotes the proportional gain and Kd denotes the derivative gain. Similarly, _A1, _A2 and _ø denote the parameters of the oscillation state. For example, "Kp_A1" denotes the proportional gain of $A_1$ among the output signal of the oscillation detecting means 130. It should be noted that the table shown in FIG. 8 is a mere example, and a table specifying further details about f2/f1 and ω/2π may be used.

Furthermore, although in the present embodiment the PID control is carried out and the proportional gain and derivative gain are made variable, a control-parameter-variable function may be added taking into account that the device characteristic changes in dependence upon the resonance frequency of the oscillation system. In that occasion, similar advantageous results are obtainable with any control method.

Figure 9:
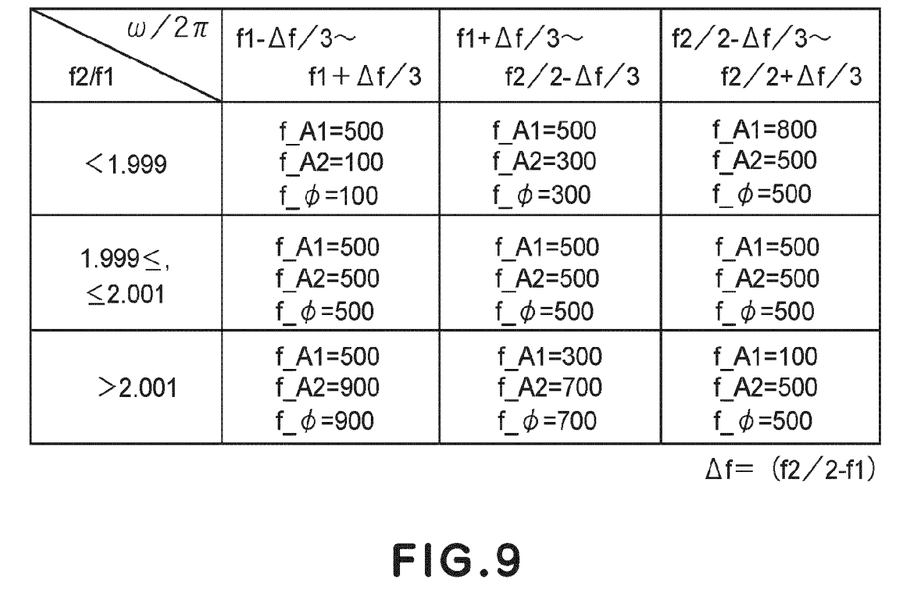
FIG. 9 shows an example of a band-limiting filter table of an oscillator device according to the present invention.

Furthermore, in the present embodiment, the drive control means 150 may provide a band-limiting filter right after the oscillation state parameters $A_1$, $A_2$ and ø are inputted from the oscillation detecting means. The band-limiting filter is able to adjust the band to be restricted. When the control parameter adjusting means 151 adjusts the control parameters based on the output of the resonance frequency calculating means 140 and the driving angular frequency ω, the restricting band of the band-limiting filter may be changed. More specifically, if f2/f1 is less than 2, the band may be lowered; whereas if f2/f1 is greater than 2, the band may be put up. In this manner, unstableness of the control due to changes of the device characteristics can be reduced. In the present embodiment, a low-pass filter may be used as the band-limiting filter. For example, in the present embodiment, the band which the band-limiting filter restricts may be determined on the basis of a table shown in FIG. 9. In FIG. 9, "f_A1", "f_A2" and "f_ø" denote the band (Hz) to restrict with reference to the respective parameters. It should be noted that the table shown in FIG. 9 is a mere example, and a table specifying further details about f2/f1 and ω/2π may be used.

Image Forming Apparatus

Next, an image forming apparatus using an oscillator device according to the present embodiment will be explained below. The optical deflector to be used in the image forming apparatus according to the present embodiment is the same as the oscillator device shown in FIG. 1.

Figure 10:
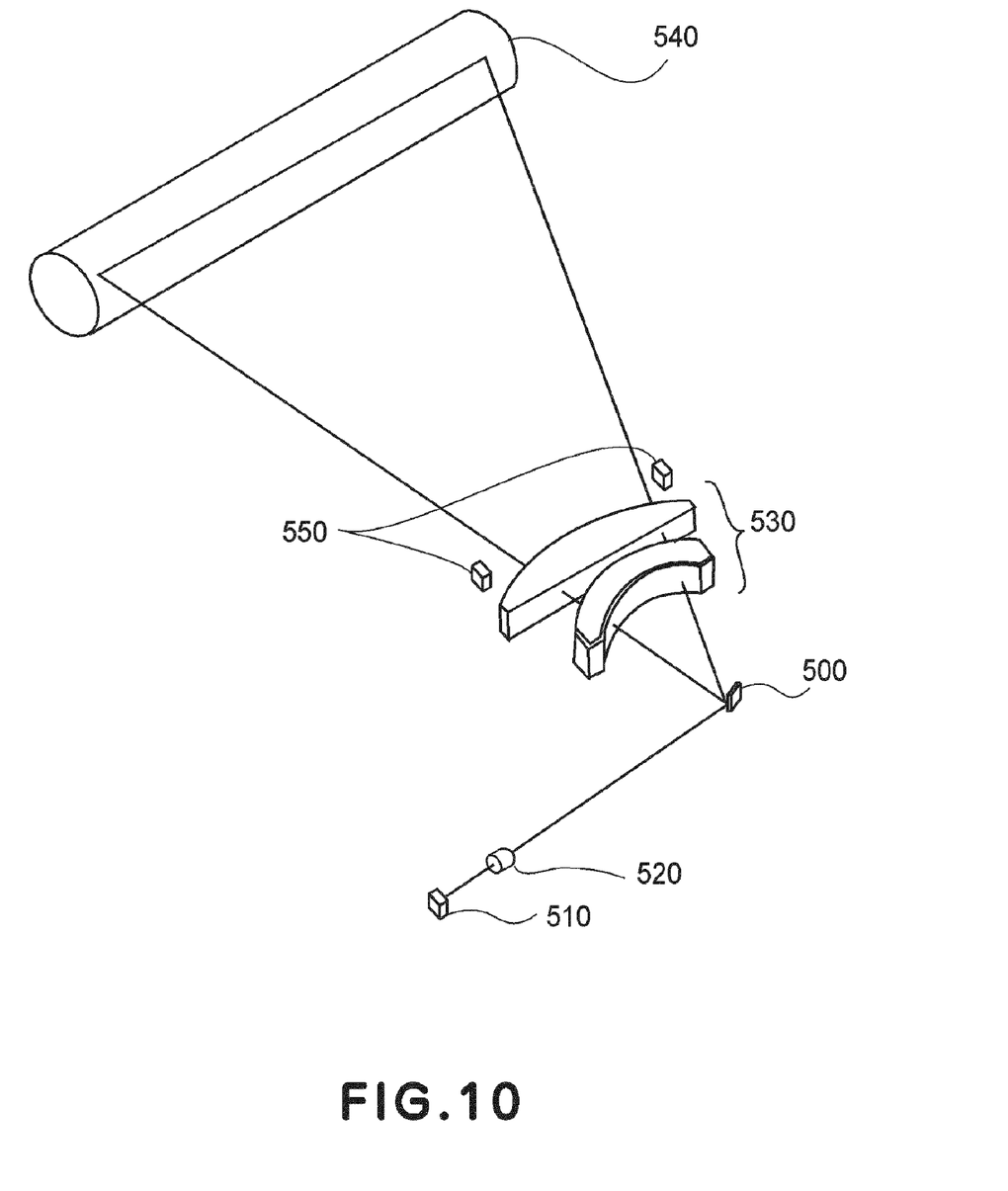
FIG. 10 is a diagram showing an image forming apparatus according to the present invention.

FIG. 10 illustrates the structure of the image forming apparatus of the present embodiment. Light emitted from a light source 510 is shaped by a collimator lens 520 and, after that, it is deflected one-dimensionally by an optical deflector 500. The scanning light passes through a coupling lens 530, and an electrostatic latent image is imaged in portion on a photosensitive member 540. Furthermore, there are two photodetectors 550 which are disposed at the scan end of the optical deflector. By driving the optical deflector 500 in accordance with the method having been described above, desired arbitrary optical scan (e.g., scanning light whose scan angle changes like an approximately sawtooth wave) having two frequency components appropriate to the image formation can be stably controlled, and a wider effective region for the printable range can be secured assuredly.

While the invention has been described with reference to the structures disclosed herein, it is not confined to the details set forth and this application is intended to cover such modifications or changes as may come within the purposes of the improvements or the scope of the following claims.

The invention claimed is:

1. An oscillator device, comprising:
   a supporting member;
   an oscillation system including at least a first oscillator, a second oscillator, a first torsion spring configured to connect the first and second oscillators with each other, a second torsion spring connected to the second oscillator and having a torsional axis aligned with a torsional axis of the first torsion spring;
   a driving device configured to oscillate the first oscillator and the second oscillator about the first and second torsional axes;
   a drive control device configured to control said driving device;
   an oscillation detecting device configured to detect a state of oscillation of at least one of the first oscillator and the second oscillator;
   a resonance frequency calculating device configured to calculate a resonance frequency of said oscillation system based on an output of said oscillation detecting device; and
   a control parameter adjusting device configured to adjust a control parameter of said drive control device,
   wherein said drive control device supplies a driving signal to said driving device so that at least one of the first oscillator and the second oscillator is brought into a state of oscillation which can be represented by an equation including at least a term $A_1 \sin\omega t + A_2 \sin(n\omega t + \phi)$ where n is an integer not less than 2,
   wherein said control parameter adjusting device adjusts the control parameter based on an output of said resonance frequency calculating device, and
   wherein $A_1$, $A_2$ and ø are coefficients representing the state of oscillation of at least one of said first and second oscillators, ω is angular frequency, and t is time.

2. An oscillator device according to claim 1, wherein said control parameter adjusting device adjusts the control parameter based on an output of said resonance frequency calculating device and the angular frequency of the driving signal.

3. An oscillator device according to claim 1, wherein said control parameter adjusting device adjusts at least one of a proportional gain, an integral gain and a derivative gain which are PID control parameters, and wherein said drive control device performs feedback control based on at least one of the proportional gain, the integral gain and the derivative gain.

4. An oscillator device according to claim 3, wherein said control parameter adjusting device includes a table having stored therein PID control parameters corresponding to the resonance frequency of said oscillation system, and wherein said control parameter adjusting device chooses a PID control parameter based on an output of said resonance frequency calculating device to adjust the control parameter.

5. An oscillator device according to claim 3, wherein said control parameter adjusting device includes a table having stored therein PID control parameters corresponding to the resonance frequency of said oscillation system and the angular frequency of the driving signal, and wherein said control parameter adjusting device chooses a PID control parameter based on an output of said resonance frequency calculating device and the driving angular frequency to adjust the control parameter.

6. An oscillator device according to claim 1, wherein said drive control device includes a band-limiting filter, and wherein the frequency to be band-limited is adjusted by said control parameter adjusting device.

7. An oscillator device according to claim 6, wherein said control parameter adjusting device includes a table having stored therein a frequency to be band-limited, corresponding to the resonance frequency of said oscillation system, and wherein said control parameter adjusting device chooses a frequency to be band-limited, based on an output of said resonance frequency calculating device to adjust the control parameter.

8. An oscillator device according to claim 6, wherein said control parameter adjusting device includes a table having stored therein a frequency to be band-limited, corresponding to the resonance frequency of said oscillation system and the angular frequency of the driving signal, and wherein said control parameter adjusting device chooses a frequency to be band-limited, based on an output of said resonance frequency calculating device and the angular frequency of the driving signal, to adjust the control parameter.

9. An oscillator device according to claim 1, wherein said driving control device supplies to said driving device a driving signal which is represented by an equation including at least a term $B_1 \sin \omega t + B_2 \sin(n\omega t + \psi)$, where $B_1$, $B_2$ and $\psi$ are parameters of the driving signal.

10. An oscillator device according to claim 9, wherein said oscillation detecting device detects at least one of $A_1$, $A_2$ and $\emptyset$, and wherein said drive control device adjusts at least one of $B_1$, $B_2$ and $\psi$ of the driving signal so that at least one of the $A_1$, $A_2$ and $\emptyset$ takes a predetermined value.

11. An optical deflector, comprising:
an oscillator device as recited in claim 1; and
a reflection surface formed on at least one of the first oscillator and the second oscillator.

12. An image forming apparatus, comprising:
a light source;
an optical deflector as recited in claim 11; and
a photosensitive member;
wherein said optical deflector is configured to deflect light from said light source so that at least a portion of the light is projected on said photosensitive member to form a latent image thereon.

* * * * *